United States Patent [19]

Wohlfarth et al.

[11] 4,076,684
[45] Feb. 28, 1978

[54] ORGANOPOLYSILOXANE COMPOSITIONS AND ELASTOMERS PREPARED THEREFROM

[75] Inventors: Ernst Wohlfarth; Wolfgang Hechtl, both of Burghausen; Klaus Matejcek, Munich; Adolf Kleinschwarzer, Marktl, all of Germany

[73] Assignee: Wacker-Chemie GmbH, Munich, Germany

[21] Appl. No.: 746,907

[22] Filed: Dec. 2, 1976

[30] Foreign Application Priority Data

Dec. 15, 1975 Germany .............................. 2556420

[51] Int. Cl.$^2$ .............................................. C08L 83/04
[52] U.S. Cl. ................................................ 260/37 SB
[58] Field of Search ..................................... 260/37 SB

[56] References Cited

U.S. PATENT DOCUMENTS

| 3,661,817 | 5/1972 | Hamilton et al. ........... 260/37 SB X |
| 3,758,441 | 9/1973 | Nitzsche et al. ............ 260/37 SB X |
| 3,759,867 | 9/1973 | Merrill et al. ..................... 260/37 SB |
| 3,862,065 | 1/1975 | Yokokawa et al. ......... 260/37 SB X |
| 3,919,161 | 11/1975 | Glaister et al. .................. 260/37 SB |
| 3,948,848 | 4/1976 | Mink ................................. 260/37 SB |

Primary Examiner—Lewis T. Jacobs

[57] ABSTRACT

Organopolysiloxane compositions which contain glass fibers having an average length of up to about 0.5 mm. The compositions are flowable in the absence of a solvent and can be cured at room temperature or moderately elevated temperatures to form elastomers having a high tear resistance and a high durometer.

11 Claims, No Drawings

ORGANOPOLYSILOXANE COMPOSITIONS AND ELASTOMERS PREPARED THEREFROM

The present invention relates to curable organopolysiloxane compositions, particularly to flowable organopolysiloxane compositions containing glass fibers and more particularly to a process for curing the organopolysiloxane compositions to form elastomers. The compositions of this invention can be cured at room temperature or at moderately elevated temperatures to form elastomers which have a surprisingly high durometer and a high tear resistance.

German Patent specification No. 22.11.377, published Sept. 13, 1973, describes diorganopolysiloxane compositions which upon the addition of cross-linking agents, cure at room temperature or at slightly elevated temperatures to form elastomers. The curable compositions described therein which contain very finely dispersed silicon dioxide, are flowable in the absence of a solvent and the resultant organopolysiloxane elastomers are resistant to tear. The finely dispersed silicon dioxide employed in the composition described in the cited reference is obtained through the reaction of organosilicon compounds with the silicon dioxide "before" and/or during the time the reactive mixture is subjected to mechanical stress which increases the bulk density of the silicon dioxide to from 150 to 320 gm/l. The mixture may, if desired, be subjected to further mechanical stress to reduce the bulk density of the silicon dioxide compound to from 20 to 85 gm/l. Although the compositions described in the cited reference yield elastomers having a high tear resistance, they do not have a high durometer.

The above cited patent specification also discloses that the diorganopolysiloxane compositions which cure in the presence of cross-linking agents at room temperature or at moderately elevated temperatures to form elastomers, may also contain glass fibers. However, up to the present no diorganopolysiloxane compositions containing glass fibers have been known which cure to form elastomers at room temperature or at moderately elevated temperatures, that are flowable in the absence of a solvent and produce elastomers having a high tear resistance, and a high durometer.

In contrast to the organopolysiloxane compositions described in the reference, the diorganopolysiloxane compositions of this invention form elastomers which have a surprisingly high tear resistance and a surprisingly high durometer. Furthermore, the compositions, even in the absence of a solvent, are so flowable that they can be applied by pouring and form flat surfaces without any necessity for subsequent mechanical treatment. Thus, when these compositions are used in casting processes, reproducable results are essentially guaranteed.

Therefore it is an object of this invention to provide a curable organopolysiloxane composition. Still another object of this invention is to provide a curable organopolysiloxane composition which is flowable in the absence of a solvent. A further object of this invention is to provide an organopolysiloxane composition which is curable into an elastomer having a high tear resistance and a high durometer. A still further object of this invention is to provide a process for preparing elastomers having a high tear resistance and a high durometer.

The foregoing objects and others which will become apparent from the following description are accomplished in accordance with this invention, generally speaking, by providing curable organopolysiloxane compositions which contain glass fibers having an average length of up to about 0.5 mm. These compositions are flowable in the absence of a solvent and are curable at room temperature or at moderately elevated tempratures to form elastomers having a high tear resistance and a high durometer.

More particularly, the curable compositions of this invention contain a diorganopolysiloxane, glass fibers, and at least 3 condensable groups and/or condensable atoms for each molecule of the diorganopolysiloxane and if desired condensation catalysts. If the curable diorganopolysiloxanes contain in each of their terminal units an aliphatic unsaturated group which is bonded to silicon via carbon, then organosilicon compounds which have at least three Si-bonded hydrogen atoms per molecule and catalysts which promote the addition of Si-bonded hydrogen to aliphatic unsaturated groups are employed.

Diorganopolysiloxanes which have been used heretofore to form elastomers at room temperature (RTV = Room Temperature Vulcanizing) or moderately elevated temperatures (LTV = Low Temperature Vulcanizing) may be used in this invention. These diorganopolysiloxanes can be represented by the following general formula:

$$Z_m SiR_{3-m}O(SiR_2O)_x SiR_{3-m}Z_m$$

wherein R which is the same or different, represents monovalent, substituted monovalent and/or polymeric hydrocarbon radicals, Z represents a hydroxyl group, hydrolyzable group and/or a hydrolyzable atom or a group containing aliphatic unsaturation which is bonded to silicon via carbon, $m$ is 1, 2 or 3; and $x$ represents a whole number having a value of at least 10.

Although it is not generally shown in the above formula, siloxane units other than the diorganosiloxane units ($SiR_2O$) may be present on the siloxane chain. Examples of other siloxane units which may be present, generally as impurities, are those corresponding to the formulas: $RSiO_{3/2}$, $R_3SiO_{1/2}$ and $SiO_{4/2}$, where R is the same as above. However, the extent to which such other siloxane units are present should not exceed about 10 mol percent. Still other siloxane units, for example those corresponding to the formula $-OSiR_2R''SiR_2O-$, where R is the same as above and R'' is a bivalent hydrocarbon radical, such as for example a phenyl radical, may be present in larger amounts.

When the hydrocarbon radicals R are monovalent, or substituted monovalent hydrocarbon radicals, it is preferred that they contain from 1 to 8 carbon atoms.

Examples of hydrocarbon radicals represented by R are alkyl radicals, such as methyl, ethyl, propyl, butyl and hexyl radicals; alkenyl radicals such as vinyl, allyl, ethylallyl and butadienyl radicals; aryl radicals, such as the phenyl radical; alkaryl radicals, such as the tolyl radical; and aralkyl radicals, such as the beta-phenylethyl radical.

Examples of substituted hydrocarbon radicals represented by R are halogenated hydrocarbon radicals, such as for example the 3,3,3-trifluoropropyl radical, chlorophenyl and bromotolyl radicals; and cyanoalkyl radicals, such as the beta-cyanoethyl radical.

Examples of substituted or unsubstituted polymeric hydrocarbon radicals (including so-called "modified" polymers), represented by R are those which are bonded to silicon via a bivalent hydrocarbon radical having from 1 to 7 carbon atoms and which consist of repeating units which are derived from at least one compound which can be polymerized by means of addition polymerization. Examples of compounds which can be polymerized through addition polymerization are styrene, vinyl acetate, acrylic acid, methacrylic acid, acrylic acid ester, methacrylic acid ester and acrylonitrile.

When no substituted and/or unsubstituted polymeric hydrocarbon radicals represented by R are present, then it is preferred that at least 80 percent of the number of R radicals be methyl radicals.

When Z is a hydroxyl group or a group containing aliphatic unsaturation which is bonded to silicon via carbon, then $m$ is preferably always 1. When Z is a hydrolyzable group or a hydrolyzable atom, then $m$ may be 1, 2 or 3.

The hydrolyzable groups and the hydrolyzable atoms represented by Z can be the same as those which have been used heretofore in the preparation of silicon compositions which cure at room temperature in the presence of moisture to form elastomers. Examples of hydrolyzable groups represented by Z are acyloxy groups (—OOCR'), substituted and unsubstituted hydrocarbonoxy groups (—OR'), hydrocarbon oxy hydrocarbonoxy groups (—OR"OR', where R" is the same as above), aminoxy groups (—ONR'$_2$), amino groups (—NR'$_2$), acylamino groups (—NR'COR'), oxime groups (—ON=CR'$_2$) and phosphate groups

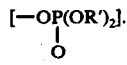

In these formulas R' represents the same or different substitued or unsubstituted monovalent hydrocarbon radicals and hydrogen atoms. Examples of substituted and unsubstituted hydrocarbon radicals represented by R' are the same as those represented by R.

Examples of acyloxy groups are those having from 1 to 18 carbon atoms, such as formyloxy, acetoxy, propionyloxy, valeroyloxy, caproyloxy, myristyloxy, and stearoyloxy groups.

Examples of hydrocarbonoxy groups are alkoxy groups having from 1 to 10 carbon atoms, such as methoxy, ethoxy, n-propoxy, isopropoxy, butoxy, hexyloxy, heptyloxy and octyloxy groups. Other hydrocarbonoxy groups having from 1 to 10 carbon atoms are vinyloxy, allyloxy, ethylallyloxy, isopropenyloxy, butadienyloxy, and phenoxy groups.

An example of a hydrocarbonoxy hydrocarbonoxy group is the methoxyethyleneoxy group.

Examples of aminoxy groups are dimethylaminoxy, diethylaminoxy, dipropylaminoxy, dibutylaminoxy, dioctylaminoxy, diphenylaminoxy, ethylmethylaminoxy, and methylphenylaminoxy groups.

Examples of amino groups are n-butylamino, sec.-butylamino and cyclohexylamino groups.

An example of an acylamino groups is the benzoylmethylamino group.

Examples of oxime groups are acetaldoxime, acetophenonoxime, acetonoxime, benzophenonoxime, 2-butanonoxime, diisopropylketoxime and chlorocyclohexanonoxime groups.

Examples of phosphate groups are dimethylphosphate, diethylphosphate, dibutylphosphate, dioctylphosphate, methylethylphosphate, methylphenylphosphate and diphenylphosphate groups.

Examples of hydrolyzable atoms represented by Z are halogen atoms, particularly chlorine atoms as well as hydrogen atoms.

Examples of Z groups which contain aliphatic unsaturation and which are bonded to silicon via carbon, are vinyl and allyl groups.

One of the advantages of this invention is that the curable composition can be poured in the absence of a solvent. Thus, the viscosity of the diorganopolysiloxanes employed pursuant to this invention is preferably in the range of from 100 cP to 500,000 cP at 25° C and more preferably from 1,000 cP to 150,000 cP at 25° C. Mixtures of various curable diorganopolysiloxanes can be employed.

It is preferred that the average length of the glass fibers employed in the composition of this invention not exceed about 0.2 mm. Surprisingly, outstanding results are achieved when the glass fibers have an average length of 0.2 mm. This is in contrast to U.S. Pat. No. 3,862,065, which teaches that when glass fibers having an average length of 0.2 mm are incorporated in organopolysiloxane resin molding compounds, the resultant molded objects have undesirable mechanical properties. It is preferred that the average length of the glass fibers employed in the compositions of this invention be at least 0.1 mm.

It is preferred that the diameter of the glass fibers be no more than 100 micrometers (1 micrometer = 1 micron = $1 \times 10^{-6}$m). Glass fibers having a diameter of 10 micrometers provide excellent results.

Elastomers having a surprisingly high durometer and surprisingly high tear resistance, can be obtained even when the glass fibers are coated with an agent which improves adhesion between the polymers and the glass fibers. Examples of suitable agents which may be employed for improving the adhesion of polymers on glass are the so-called "chrome dressings" and silanes containing an organo-functional group, e.g., vinyltriacetoxysilane, vinyltriethoxysilane, methacryloxypropyltriethoxysilane and beta-aminoethylgamma-aminopropyltriethoxysilane.

It is preferred that glass fibers be employed which are free of agents which improve the adhesion of polymers on glass. Surprisingly, we have found that the curable compositions have a lower viscosity and are thus more flowable and easier to work with on flat surfaces when the glass fibers employed in the curable composition are substantially free of agents which tend to improve the adhesion of polymers on glass. Moreover, organopolysiloxane elastomers having a high durometer and a high tear resistance can be obtained from curable compositions which are free of the agents which tend to improve the adhesion of polymers to glass fibers. Furthermore glass fibers which are substantially free of agents which tend to improve the adhesion of polymers on glass are cheaper than glass fibers which contain agents which promote adhesion.

The durometer and tear resistance of the organopolysiloxane elastomers prepared from the compositions of this invention are directly proportional to the amount of glass fibers used in the composition, i.e., as the amount of glass fibers increases, the durometer and tear resistance increases. It is preferred that the amount of glass fibers employed in the composition be from about 1 to 50 percent by weight based on the total weight of the curable composition. However, if more than 50 percent by weight of glass fibers based on the total weight of the curable composition is used, it may result in a decrease in the composition's flowability. When less than 1 percent by weight based on the total weight of the curable composition is used, it is possible that the desired result will not be achieved.

Excellent results are achieved when the glass fibers are employed in an amount of about 10 percent by weight based on the total weight of the curable composition.

If the composition contains diorganopolysiloxanes having hydrolyzable and condensable groups and/or hydrolyzable and condensable atoms, then the moisture present in atmospheric air may be sufficient to cross-link or cure the composition at room temperature Cross-linking can be accelerated by heating or by exposing the composition to additional aqueous vapor.

If the composition contains diorganopolysiloxanes which have an Si-bonded hydroxyl group in each of their terminal units, then they can be cured or cross-linked at room temperature by the addition of cross-linking agents having at least 3 condensable groups and/or condensable atoms per molecule. Condensation catalysts may be employed when necessary or desired. Curing or cross-linking can be accelerated by the addition of water and/or heating.

Examples of preferred cross-linking agents having at least 3 condensable groups and/or condensable atoms per molecule are silanes corresponding to the general formula:

$$R_n Si(OR')_{4-n},$$

in which R and R' are the same as above, and $n$ is 0 or 1, or siloxanes which are flowable at room temperature and which contain at least 3 SiOR' groups and/or at least 3 Si-bonded hydrogen atoms per molecule and the silicon valences which are not satisfied by siloxane oxygen atoms, R'O groups and hydrogen atoms, are satisfied by R groups.

Examples of suitable cross-linking agents are methyltriethoxysilane, tetraethoxysilane, "ethylsilicate 40" i.e. an ethylpolysilicate with an analytical SiO$_2$ content of approximately 40 percent by weight, isopropylpolysilicates, n-butylpolysilicates, methyl-n-butoxy-diethoxysilane, dimethyltetraethoxydisiloxane, hexaethoxydisiloxane, methyltris(methoxyethyleneoxy)-silane and methyl hydrogen polysiloxanes.

It is preferred that the compositions employed in this invention be those in which the cross-linking agents are added just prior to molding. Through the use of condensation catalysts, these so-called "two-component systems" cure at room temperature within easily predetermined timespans and are thus especially suited for pouring or molding (often referred to as "copying") processes. Although it is not preferred, the so-called "single component systems" may also be employed. Thus, these compositions may be stored under anhydrous conditions and when exposed to water, cure to elastomers. Examples of suitable cross-linking agents which may be employed in the preparation of single component systems, are silanes corresponding to the general formula $R_n SiZ'_{4-n}$, where R and $n$ are the same as above and Z' represents a hydrolyzable group. The hydrolyzable groups represented by Z above are equally applicable to the Z' groups.

Cross-linking agents having at least 3 condensable groups and/or condensable atoms per molecule are preferably used in an amount of from 0.5 to 10 percent by weight based on the weight of the curable organopolysiloxanes.

As indicated heretofore, condensation catalysts may be employed to accelerate curing of the composition. Examples of suitable condensation catalysts are metal carboxylic acid salts or organometallic carboxylic acid salts in which the metals are selected from the electromotive series of from lead to manganese (cf. Handbook of Chemistry and Physics, 31st Edition, Cleveland, Ohio, 1949, page 1465). Tin is the preferred cation of said salts. Individual examples of tin salts of the previously defined type are dibutyltin dilaurte, dibutyltin diacetate, tin-II-octoate, dibutyltin diacylate, in which the acylate groups are derived from a mixture of carboxylic acids having from 9 to 11 carbon atoms per molecule and in which the carboxyl group in at least 90 percent by weight of the acids is bonded to a tertiary carbon atom; dibutyltin dioctoate and distannoxanes, such as for example diacetoxytetrabutyldistannoxane and dioleyloxytetramethyldistannoxane. Examples of condensation catalysts having cations other than tin are ferrioctoate, lead octoate, lead laurate and cobalt naphthenate. Other examples of condensation catalysts are titanium esters, such as tetrabutyltitanate amines, such as n-hexylamine; as well as amino salts, such as n-hexylaminohydrochloride and n-butylaminoacetate.

The condensation catalysts are preferably employed in amounts of from 0.2 to 10 percent by weight based on the weight of the curable organopolysiloxanes.

When the organopolysiloxane composition contains terminal aliphatic unsaturated groups which are bonded to silicon via carbon, then they may contain organosilicon compounds having at least 3 Si-bonded hydrogen atoms per molecule and catalysts which promote the addition of Si-bonded hydrogen to the aliphatic unsaturated bonds when the compounds are cross-linked or cured at room temperature or at slightly elevated temperatures, generally no more than about 150° C. The organosilicon compounds which contain at least 3 Si-bonded hydrogen atoms per molecule are generaly organopolysiloxanes, especially methylhydrogenpolysiloxanes.

The organosilicon compounds having at least 3 Si-bonded hydrogen atoms per molecule are preferable employed in amounts of from 0.5 to 20 percent by weight based on the weight of the curable organopolysiloxanes.

Suitable examples of catalysts which promote the addition of Si-bonded hydrogen on aliphatic multiple bonds are platinum, platinum supported on finely divided carriers, such as silicon dioxide or activated charcoal, and platinum complexes such as the product obtained from the reaction of platinum(IV)chloric acid with other inorganic compounds and/or organic compounds, including silicon organic compounds.

Examples of such reaction products or complexes are products obtained from the reaction of platinum(IV)-chloric acid with ketones, such as cyclohexanone and platinum complexes in which platinum is chemically bonded with 1,3-divinyltetramethyldisiloxane. Platinum and platinum compounds are preferably used in amounts of from 0.5 to 500 ppm (parts by weight per million parts by weight) calculated as Pt and based on the weight of the organopolysiloxanes. Other examples of catalysts which promote the addition of Si-bonded hydrogen on aliphatic unsaturated bonds are rhodium compounds and rhodium complexes, iridium compounds and iridium complexes as well as cobalt and manganese carbonyl.

In addition to the thermosetting diorganopolysiloxanes, glass fibers, cross-linking agents and condensation catalysts which promote the addition of Si-bonded hydrogen on aliphatic unsaturated compounds, the composition may also contain other additives which are generally added during the formation of organopolysiloxane elastomers. Examples of such additives are fillers such as pigments, soluble dyes, scenting agents, peroxides, heat stabilizers, antioxidants, polyvinyl chloride powder, agents which improve the adhesion of the elastomers, ultraviolet absorbers, polyglycols which can be etherified and/or esterified, softening agents, agents which delay curing, such as benzotriazole and cell-generating agents such as azodicarbonamide.

Examples of suitable softening agents which may be employed are trimethylsiloxy end-blocked diethylpolysiloxanes.

Fillers other tha glass fibers which can be incorporated in the composition of this invention are reinforcing fillers, such as for example precipitated silicon dioxide having a surface area of at least 50 m²/gm and/or pyrogenically produced silicon dioxide. However, a portion of the fillers may consist of non-reinforcing fillers. Examples of such fillers or pigments are diatomaceous earth, quartz meal, including cristobalite-meal, pigment titanium dioxide, zirconium silicate, calcium carbonate, iron oxide and zinc oxide. Fibrous fillers other than glass fibers, such as for example asbestos, may also be employed. The fillers, other than the glass fibers may contain organosiloxy groups on their surfaces. These may be prepared by reacting the fillers with for example, trimethylethoxysilane in a ball mill or they may be reacted with hexamethyldisiloxane simultaneously with and/or subsequently to mixing with the thermosetting diorganopolysiloxanes.

The composition of this invention can be used in the preparation of molded objects and coatings and for the filling of interstices. The elastomers prepared in accordance with this invention not only have a high durometer and a high tear resistance but also have a high degree of resilience. The high durometer and tear resistance of these elastomers is attributed to the face that the average length of the glass fibers do not exceed 0.5 mm. The molded objects may constitute cable end-closures or molds for the pouring of concrete or polyester or they maybe used in the preparation of polyurethane foams. These compositions can be used for coating and filling interstices in which electrical or electronic devices are embedded or they can be used as sealants.

The tear resistance values in the following examples were determined in accordance with ASTM-D-624 Form B.

In the following examples, all the parts are by weight unless otherwise specified.

The platinum siloxane complex employed in the following example was prepared as follows:

To a mixture containing 10 parts of $H_2PtCl_6 \cdot 6H_2O$, 20 parts of 1,3-divinyltetramethyldisiloxane and 50 parts of ethanol was added about 20 parts of sodium bicarbonate. The mixture was refluxed for 30 minutes under constant agitation and then allowed to stand for 15 hours. Thereafter it was filtered and the volatile components were distilled off the filtrate at approximately 12 mm Hg (ab.). The residue which consisted of 17 parts by weight of a liquid was dissolved in benzene. The solution was filtered and the benzene was distilled from the filtrate.

EXAMPLE I a. To 100 parts of a mixture containing a hydroxyl terminated dimethylpolysiloxane having a viscosity of 12,000 cP at 25° C. and cristobalite meal in a weight ratio of dimethylpolysiloxane to cristobalite of 2:1 are added glass fibers in an amount of 10, 15 and 20 parts respectively. The glass fibers have an average length of 0.2 mm and a diameter of 10 micrometers.

b. The procedure of Example 1 (a) is repeated, except that the glass fibers which have an average length of 0.2 mm and a diameter of 10 micrometers have been coated with a chrominum sizing agent (chrommethacrylate chloride).

c. The procedure of Example 1(a) is repeated, except that the glass fibers have been coated with a silane which is used to improve the adhesion of polymers on glass.

The viscosities at 25° C. of the mixtures obtained in accordance with Examples 1 (a), (b) and (c) which contain 20 parts of glass fibers for each 100 parts of other components are as follows:

TABLE I a

| Mixture (Example No.) | Adhesion improving agent | Viscosity |
|---|---|---|
| a | none | .68,000 cP |
| b | Chromium sizer | 202,000 |
| c | silane | 132,000 |

The mixtures obtained in accordance with Examples 1 (a), (b) and (c) as well as a companion mixture (v) which is free of glass fibers and contains hydroxyl terminated dimethylpolysiloxanes having a viscosity of 12,000 cP at 25° C. and cristobalite meal in a weight ratio of 2:1, are mixed with 2 parts by weight based on the weight of the mixtures, of a mixture containing 3 parts hexaethoxydisiloxane and 1 part dibutyltin diacylates, in which the acylate groups are derived from a mixture of carboxylic acids having from 9 to 11 carbon atoms per molecule, in which the carboxyl group in at least 90 percent by weight of the acids is bonded to a tertiary carbon atom. The product obtained is poured to form a layer 2 mm thick and is allowed to cure at room temperature. The durometer (Shore-A hardness) and the tear resistance of the thus obtained elastomers measured 11 days after initial curing, are shown in Table I b.

TABLE I b

| Elastomer (Example No.) | Percent Glass Fibers * | Adhesion Improving Agents | Shore-A Hardness | Tear Resistance kp/cm |
|---|---|---|---|---|
| a | 10 | — | 57 | 10.3 |
| a | 15 | — | 63 | 13.0 |
| a | 20 | — | 65 | 14.6 |
| b | 10 | chromium sizer | 57 | 7.9 |
| b | 15 | chromium sizer | 62 | 11.2 |
| b | 20 | chromium sizer | 65 | 11.2 |
| c | 10 | silane | 54 | 6.8 |
| c | 15 | silane | 58 | 7.9 |
| c | 20 | silane | 62 | 8.8 |
| v | — | — | 41 | 3.8 |

* Per 100 parts dimethylpolysiloxane and cristobalite mixture.

EXAMPLE 2 a. About 20 parts of glass fibers of the type described in Example 1 (a) are mixed with 100 parts of hydroxyl terminated dimethylpolysiloxanes having a viscosity of 22,000 cP at 25° C. The mixture is mixed with 2 percent by weight based on the weight of the mixture of a mixture containing 3 parts of hexaethoxydisiloxane and 1 part of dibutyltinacylates in which the acylate groups are derived from a mixture of carboxylic acids having from 9 to 11 carbon atoms per molecule, in which the carboxyl groups in at least 90 percent by weight of the acids is bonded to a tertiary carbon atom. The composition is poured to form a layer 2 mm thick and left to cure at room temperature.

v1. For purposes of comparison the procedure of Example 2 (a) is repeated except that the glass fibers are omitted.

b. The procedure of Example 2 (a) is repeated, except that 100 parts of hydroxyl terminated dimethylpolysiloxanes having a viscosity of 80,000 cP at 25° C. is substituted for the hydroxyl terminated dimethylpolysiloxanes having a viscosity of 22,000 cP at 25° C.

v2. For comparison purposes, the procedure of Example 2 (b) is repeated, except that the glass fibers are omitted.

The durometer (Shore-A hardness) and the tear resistance of the thus obtained elastomers, as measured 11 days after initial curing are as follows:

TABLE II

| Elastomers | Shore-A hardness | Tear resistance kp/cm |
|---|---|---|
| a | 36 | 3.5 |
| v 1 | 22 | 1.2 |
| b | 36 | 4.0 |
| v 2 | 21 | 1.6 |

EXAMPLE 3 a. A mixture consisting of 120 parts of an organopolysiloxane consisting of methylhydrogen siloxane, dimethylsiloxane and trimethylsiloxane units with approximately 1 Si-bonded hydrogen atom for each 40 Si-atoms and having a viscosity of 7,400 cP at 25° C., 24 parts of hexamethyldisilazane, 8 parts of water and 120 parts of pyrogenically obtained silicon dioxide are placed in a kneading machine. The mixture is heated to 150° C. at 50 mm Hg (abs.) under constant kneading to remove the volatile components. After cooling, it is mixed with 210 parts of a dimethylpolysiloxane having on the average, one vinyldimethylpolysiloxane and one dimethylhydrogensiloxane unit per molecule and a viscosity of 2,300 cP at 25° C. and, then with 43.5 parts of quartz meal, 4 parts of a pigment quality titanium dioxide and 9 parts of vinyldimethylsiloxy terminated dimthylpolysiloxane having a viscosity of 160 cP at 25° C.

About 100 parts of the mixture thus obtained are mixed with 22.5 parts of glass fibers of the type described in Example 1 (a), then about 9 parts of this mixture are mixed with 1 part of a mixture consisting of 16 parts of a vinyldimethylsiloxy terminated dimethylpolysiloxane having a viscosity of 160 cP at 25° C., 1.7 parts of iron oxide powder, 0.35 parts of hydrophobic, pyrogenically produced silicon dioxide and 50 ppm of platinum in the form of the platinum siloxane complex prepared above. The composition thus obtained is poured onto a polished steel plate to form a layer 2 mm thick and cured at room temperature.

b. The procedure described in Example 3 (a) is repeated, except that 22.5 parts of the glass fibers described in Example 1 (b) are substituted for the glass fibers of Example 1 (a).

c. The procedure described in Example 3 (a) is repeated, except that 22.5 parts of the glass fibers described in Example 1 (c) are substituted for the glass fibers of Example 1 (a).

v. For comparison purposes, the procedure of Example 3 (a) is repeated except that glass fibers are omitted.

The viscosities at 25° C. of the composition produced in accordance with Examples 3 (a), (b) and (c) prior to the addition to the mixture containing the platinum catalyst are as follows:

TABLE III a

| Composition (Example No.) | Adhesion improving agent | Viscosity cP |
|---|---|---|
| a | — | 114,000 |
| b | chromium sizer | 800,000 |
| c | silane | 496,000 |

Among the compositions prepared according to Examples 3 (a), (b) and (c), the composition prepared in Example 3 (a) provides a smooth, even surface much more quickly after pouring than the other compositions.

The following Table III b shows the durometer (Shore-A hardness) and the tear resistance of the elastomer prepared in accordace with the procedure described in Examples 3 (a), (b), (c) and (v), as measured 11 days after initial curing and 24 hours of heat aging at 150° C.

TABLE III b

| Elastomer produced (Example No.) | Adhesion improving agent | | Shore-A hardness | Tear Resistance kp/cm |
|---|---|---|---|---|
| a | — | without aging | 54 | 13.9 |
|   |   | with aging | 61 | 16.2 |
| b | chromium sizer | without aging | 56 | 9.1 |
|   |   | with aging | 62 | 11.9 |
| c | silane | without aging | 53 | 7.9 |
|   |   | with aging | 60 | 10.7 |
| v | — | without aging | 29 | 9.8 |
|   |   | with aging | 36 | 7.6 |

While specific embodiments of this invention have been described, it is not intended to limit the invention solely thereto but to include all the modifications falling within the spirit and scope of the appended claims.

What is claimed is:

1. A diorganopolysiloxane composition curable at room temperature to elastomers containing glass fibers which have an average length up to about 0.2 mm.

2. The curable composition of claim 1 wherein the glass fibers have an average length up to about 0.1 mm.

3. The curable composition of claim 1 wherein the glass fibers are substantially free of any agents which tend to improve the adhesion of polymers to a substrate.

4. The curable composition of claim 1 wherein the diorganopolysiloxane contains terminal hydroxyl groups and further contains a crosslinking agent having at least 3 condensable groups or condensable atoms per molecule.

5. The curable composition of claim 1 wherein the diorganopolysiloxane composition contains a condensation catalyst.

6. The curable composition of claim 1 wherein the diorganopolysiloxane has an aliphatic unsaturated bond linked to a silicon atom via carbon in each of its terminal units and also contains an organosilicon compound having at least three Si-bonded hydrogen atoms per molecules and a catalyst which promotes the addition of Si-bonded hydrogen to the aliphatic unsaturated bonds.

7. The curable composition of claim 1 wherein the glass fibers are present in an amount up to 50 percent by weight based on the weight of the composition.

8. An organopolysiloxane elastomer containing glass fibers with an average length up to 0.2 mm.

9. The elastomer of claim 8 wherein the glass fibers are present in an amount up to 50 percent by weight based on the weight of the composition.

10. A process for preparing an organopolysiloxane elastomer which comprises curing the composition of claim 5 at room temperature.

11. A process for preparing an organopolysiloxane elastomer which comprises heating the composition of claim 5 up to a temperature of about 150° C.

* * * * *